US007845679B2

(12) United States Patent  
Abaziou

(10) Patent No.: US 7,845,679 B2  
(45) Date of Patent: Dec. 7, 2010

(54) GAS GENERATOR FITTED WITH PRESSURE REGULATOR MEANS, AND A SAFETY DEVICE FITTED THEREWITH

(75) Inventor: Xavier Abaziou, Landerneau (FR)

(73) Assignee: Autoliv Development AB, Vargarda (DE)

( * ) Notice: Subject to any disclaimer, the term of this patent is extended or adjusted under 35 U.S.C. 154(b) by 215 days.

(21) Appl. No.: 11/665,527

(22) PCT Filed: Oct. 19, 2005

(86) PCT No.: PCT/EP2005/055372

§ 371 (c)(1),  
(2), (4) Date: Apr. 16, 2007

(87) PCT Pub. No.: WO2006/045727

PCT Pub. Date: May 4, 2006

(65) Prior Publication Data

US 2008/0111359 A1     May 15, 2008

(30) Foreign Application Priority Data

Oct. 26, 2004    (FR)   ................................. 04 11412

(51) Int. Cl.  
*B60R 21/26* (2006.01)

(52) U.S. Cl. .................. 280/736; 280/741; 280/742

(58) Field of Classification Search ................ 280/736, 280/737, 740–742, 806  
See application file for complete search history.

(56) References Cited

U.S. PATENT DOCUMENTS

| 3,638,964 | A | * | 2/1972 | Chute | 280/736 |
| 3,811,702 | A | * | 5/1974 | Kurasawa et al. | 297/470 |
| 3,900,211 | A | * | 8/1975 | Russell et al. | 280/737 |
| 3,948,540 | A | * | 4/1976 | Meacham | 280/735 |
| 3,986,456 | A | | 10/1976 | Doin et al. | |
| 5,195,777 | A | * | 3/1993 | Cuevas | 280/736 |
| 5,257,817 | A | | 11/1993 | Cuevas | |
| 5,544,918 | A | * | 8/1996 | Fleming et al. | 280/805 |

(Continued)

FOREIGN PATENT DOCUMENTS

DE      41 08 857 C1     5/1992

(Continued)

*Primary Examiner*—Faye M. Fleming  
*Assistant Examiner*—Laura Freedman  
(74) *Attorney, Agent, or Firm*—Harness, Dickey & Pierce, P.L.C.

(57) ABSTRACT

The present invention relates to a gas generator for a motor vehicle safety device, the generator comprising:. a first chamber (C) for combustion containing a pyrotechnic initiator (2) and a pyrotechnic charge (3) whose combustion is triggered by said initiator; and. a second chamber (D) for diffusion into which the gas that results from combustion of said charge (3) is transferred prior to being exhausted to the outside; these two chambers (C, D) being separated from each other by a "nozzle" partition (12) presenting at least one communication orifice (13). According to the invention, said diffusion chamber (D) is provided with a piston (5) suitable for closing or not closing said orifice (13) as a function of the gas pressure in the combustion chamber (C), said piston (5) being urged to its position for closing the orifice (13) by a mass (6) of elastically deformable material, said mass (6) presenting stiffness that varies as a function of temperature, said stiffness decreasing with increasing temperature.

17 Claims, 1 Drawing Sheet

U.S. PATENT DOCUMENTS

| | | | |
|---|---|---|---|
| 5,609,359 A * | 3/1997 | Johnson et al. | 280/736 |
| 5,618,057 A * | 4/1997 | Johnson et al. | 280/736 |
| 5,660,412 A * | 8/1997 | Renfroe et al. | 280/737 |
| 5,700,030 A * | 12/1997 | Goetz | 280/736 |
| 5,947,514 A * | 9/1999 | Keller et al. | 280/742 |
| 6,742,542 B1 * | 6/2004 | Dierks | 137/636 |
| 7,438,316 B2 * | 10/2008 | Patterson | 280/741 |

FOREIGN PATENT DOCUMENTS

WO     WO 2007025965 A1 *   3/2007

* cited by examiner

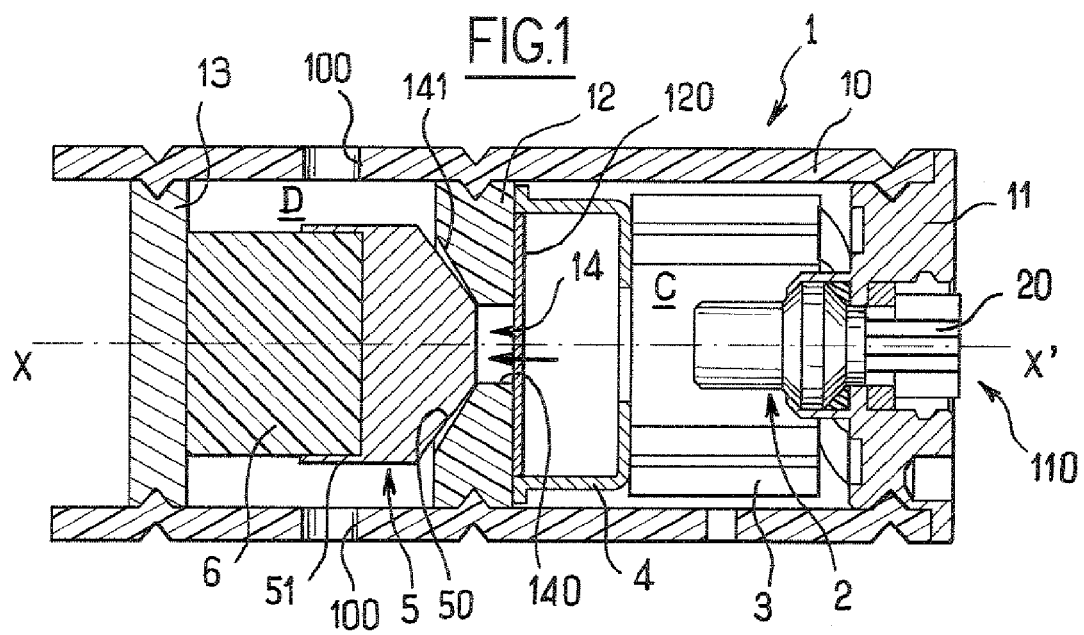
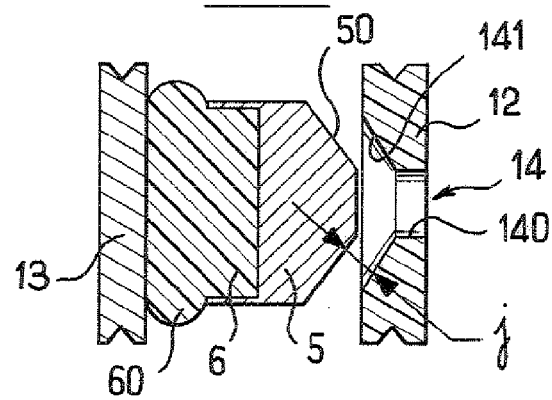
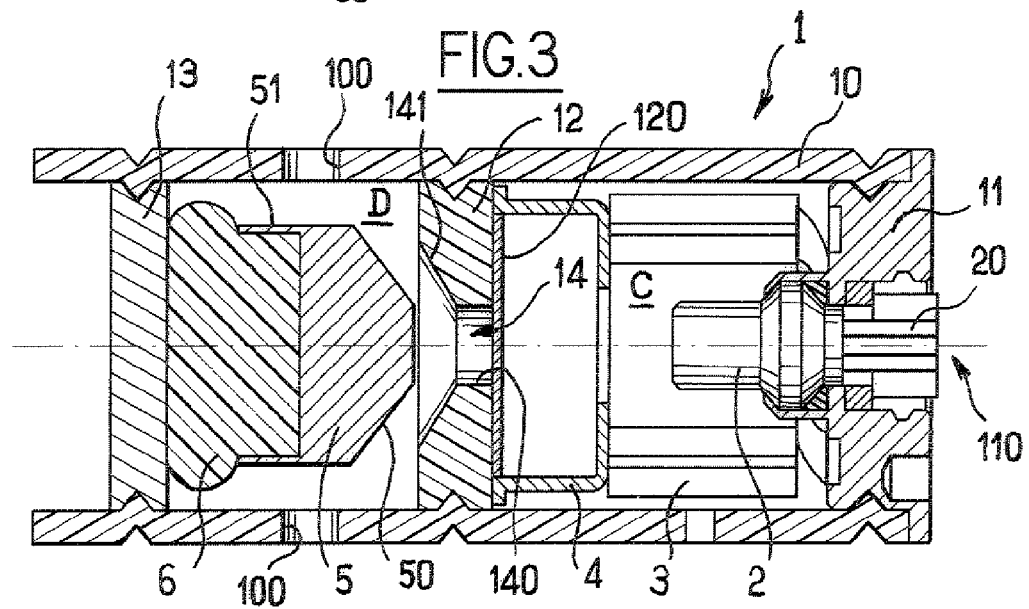

GAS GENERATOR FITTED WITH PRESSURE REGULATOR MEANS, AND A SAFETY DEVICE FITTED THEREWITH

CROSS-REFERENCE TO RELATED APPLICATIONS

This application is a 371 US National Stage of International Application No. PCT/EP2005/055372, filed Oct. 19, 2005, published as WO 2006/045727 A1 on May 4, 2006 (in English). This application claims the benefit of French Application No. 04 11412, filed Oct. 26, 2004. The disclosure(s) of the above applications is incorporated herein by reference.

FIELD

The present invention relates to a gas generator and to a safety device for a motor vehicle.

BACKGROUND AND SUMMARY

Pyrotechnic gas generators for motor vehicle safety use pyrotechnic charges constituted by propellant having a combustion speed (or burn rate) that depends on operating pressure.

Thus, below a certain pressure, the propellant goes out, and above its nominal pressure range, its combustion performance changes rapidly.

Solutions have already been proposed to solve that problem.

Thus, U.S. Pat. No. 5,700,030 describes a gas generator for a motor vehicle safety device, the generator comprising a first combustion chamber containing a pyrotechnic initiator and a pyrotechnic charge whose combustion is triggered by said initiator, and a second chamber for diffusion purposes, into which the gas that results from the combustion of said charge is transferred prior to being exhausted to the outside.

Those two chambers are separated from each other by a partition that presents a communication orifice that is closed by a capsule.

The diffusion chamber is provided with a piston suitable for closing or not closing said orifice as a function of the gas pressure in the chamber. The piston is urged continuously towards its orifice-closing position by a Belleville spring.

In practice, as soon as the gas pressure in the combustion chamber becomes sufficiently large, it pushes back the piston, compressing the spring.

That enables combustion of the propellant to be managed as well as possible.

Japanese patent document No. 08/156,737 describes a gas generator for an airbag, in which there are also provided means for regulating the pressure in the combustion chamber.

The combustion chamber is formed by a stationary housing having a perforated cylindrical wall and a piston, likewise constituted by a cylinder, and suitable for sliding in the housing. Depending on the position of the piston, a greater or smaller number of holes through the wall are uncovered, thereby putting the combustion chamber into communication with the diffusion chamber.

In certain embodiments, the piston is mounted on a spring. In another variant, a mass of elastically deformable material allows the piston to slide reversibly.

U.S. Pat. No. 6,062,598 describes a hybrid generator having a reserve of gas, which generator further includes a valve placed transversely between the combustion and diffusion chambers. The function of the valve is to constrict a channel interconnecting the two chambers.

The valve comprises a piston secured to a temperature-sensitive metal spring type element.

Depending on the position of the piston, the section available in the channel varies as a function of temperature in order to compensate for the temperature-associated pressure differences in the gas supply.

Nevertheless, it is clearly stated that the channel between the two chambers is never closed off completely. It is also stated that the position of the valve remains stationary while the generator is in operation. The valve is moved solely by the metal element that is sensitive to temperature.

The temperature range within which the generator is required to operate typically extends from −35° C. to +85° C.

The speed of combustion of the propellant also depends on temperature, which means that with a flow-rate control section that is fixed, the pressure in the combustion chamber increases with temperature, thereby leading to differences in performance depending on temperature.

The system described in above-cited U.S. Pat. No. 5,700,030 and JP-A-08/156,737 do not enable the problem to be solved since the means that they contain operate independently of temperature.

As for the system described in U.S. Pat. No. 6,062,598, its operation is strictly a function of temperature and does not take account of the pressure in the combustion chamber.

An essential aim of the present invention is to provide a gas generator whose operation is regulated, while taking account both of the pressure in the combustion chamber and of the outside temperature.

Thus, the invention mainly provides a gas generator for a motor vehicle safety device, the gas generator comprising:

a first chamber for combustion containing a pyrotechnic initiator and a pyrotechnic charge whose combustion is triggered by said initiator; and a second chamber for diffusion into which the gas that results from combustion of said charge is transferred prior to being exhausted to the outside;

these two chambers being separated from each other by a "nozzle" partition presenting at least one communication orifice.

According to the invention, said diffusion chamber is provided with a piston suitable for closing or not closing said orifice as a function of the gas pressure in the combustion chamber, said piston being urged to its position for closing the orifice by a mass of elastically deformable material, said mass presenting stiffness that varies as a function of temperature, said stiffness decreasing with increasing temperature.

By means of this characteristic, if the outside temperature is low, then the stiffness of the mass increases, thereby reducing the flow section for gas through the orifice, and possibly increasing the pressure in the combustion chamber.

Conversely, if the temperature is high, stiffness decreases, thereby increasing the flow section and reducing the pressure in the combustion chamber.

This ensures that pressure is regulated as well as possible.

According to other characteristics of the generator that are advantageous but not limiting:

said mass of elastically deformable material is made of elastomer;

said mass is constituted by a cylindrical pad;

when said generator presents a shape that is essentially cylindrical, said orifice and said piston extend on its longitudinal axis; and the proximal end of the piston for closing said orifice presents a profile that is frustoconical.

Finally, the invention also provides a motor vehicle safety device such as an airbag trigger or a safety belt retractor, that is fitted with a generator in accordance with any of the above-presented characteristics.

DRAWINGS

Other characteristics and advantages of the present invention appear on reading the following detailed description given with reference to the accompanying drawing, in which;

FIG. 1 is a longitudinal midsection view of a generator in accordance with the invention, the piston that it contains being shown in a position for closing the orifice in the partition that separates the two chambers;

FIG. 2 is a longitudinal section view of the piston, of the associated elastomer mass, and of the partition separating the two chambers; and FIG. 3 is a view analogous to FIG. 1, the piston being shown in its retracted position where it is spaced apart from said partition.

DETAILED DESCRIPTION

The gas generator shown in part in accompanying FIGS. 1 and 3 essentially comprises a combustion chamber C and a diffusion chamber D.

The generator is constituted by an enclosure formed by a hollow metal cylinder 1 of axis X-X' presenting gas exhaust orifices 100 oriented radially and situated through the wall of the diffusion (or "plenum") chamber D.

The opposite ends of this enclosure are closed by crimped closure walls 11 and 13.

A thick transverse partition 12, also referred to as a "nozzle", separates the enclosure into said combustion chamber C which communicates with the wall 11 and said diffusion chamber D which communicates with the wall 13.

The partition 12 presents an orifice 14 putting the two chambers C and D into communication with each other. The partition or nozzle 12 is closed by a capsule 120, e.g. formal by a thin metal film.

The orifice 14 is centered on the axis X-X'. Going from the chamber C towards the chamber D, it is constituted by a cylindrical segment 140 of constant circular section leading to a segment 141 of frustoconical shape. The frustoconical segment thus communicates with the chamber D via an opening that is larger than the opening putting the segment 140 into communication with the chamber C.

An initiator 2 is mounted in the wall 11 in an opening 110 centered on the axis X-X'. The initiator is contained and positioned by appropriate means.

A pyrotechnic charge 3, e.g. constituted by a propellant, surrounds the initiator. It is annular in shape and its axis of symmetry coincides with the axis X-X'. In an embodiment not shown, the charge could be made up of pellets.

The block is positioned by means of a grid 4 which also bears against the partition 12.

A piston 5 is mounted in the chamber D, centered on the axis X-X'. By way of example, the piston is constituted by a metal body having a proximal end that closes the orifice 14, and that is in the form of a frustoconical profile 50 that is substantially complementary to the profile of the above-mentioned segment 141.

In an embodiment not shown, the frustoconical profile of the piston 50 is complementary to that of the segment 141. This variant serves to reduce the risk of leaks between the piston 5 and the partition or nozzle 12.

Naturally, depending on the particular shape of the orifice 14, the shape and the size of the piston 5 are adapted accordingly.

Behind the piston 5 there is mounted a mass 6 of elastically deformable material, which in this case is constituted by a pad of elastomer.

The pad is cylindrical and, when at rest, i.e. when in the non-compressed state as shown in FIG. 5, its diameter is equal to that of the piston, for example.

The pad is engaged and held behind the piston 5 by means of a peripheral collar 51 which is integral with the piston.

In accordance with the present invention, the mass 6 has the feature of presenting stiffness that is variable as a function of temperature, said stiffness increasing when temperature increases.

In other words, this stiffness is large at low temperatures and smaller at higher temperatures.

By way of example, the elastomer used presents the characteristic that its stiffness varies by 20% to 40% over the temperature range $-40°$ C. to $+100°$ C.

The operation of such a generator is explained below, thereby showing up the advantages of having the above-mentioned characteristics.

Before the generator 1 is triggered, its component elements occupy the position shown in FIG. 1, which means that the mass 6 tends to push the piston 5 against the partition 12 so as to close the orifice 14 therein.

In operation, a firing current is transmitted to the initiator 2 via terminal pins 20. This ignition then initiates the charge contained in the cap of the initiator.

Thereafter, the pressure therein increases causing the cap to open and/or fragment, thus allowing gas and flame to escape therefrom, i.e. into the chamber C.

The flame and the gas in turn ignite the pyrotechnical charge 3.

The gas that results from this combustion causes the pressure inside the chamber C to increase progressively. Above a certain pressure level (about 10 megapascals (MPa)), the capsule 120 breaks under the shear effect. The gas under pressure then acts on the piston 5.

This pressure generates a force on the piston 5 and on the mass 6 of elastomer, acting in the direction of arrow F in FIG. 1.

Under the effect of this force, the mass 6 which is held captive axially between the piston 5 and the partition 12 will contract axially, and simultaneously expand radially, thus enabling the piston to move axially in the direction of above-mentioned arrow F, thereby opening the orifice 14.

Clearance i (see FIG. 2) then arises between the frustoconical profile 50 of the piston and the orifice 14, and gas is evacuated into the chamber D via its clearance.

It is this clearance, and more particularly the way it varies dynamically, that governs and controls combustion of the propellant charge (whether a block or pellets).

If the pressure in the combustion chamber C rises, then the clearance i, and consequently the section available for transferring gas, increases, thereby causing the pressure in said chamber to drop.

Conversely, if the pressure is too low, then the clearance i decreases, causing the pressure to rise.

As specified above, the elastomer used possesses stiffness that varies as a function of temperature.

Thus, when the outside temperature is low, e.g. about $-35°$ C., the stiffness of the elastomer increases so that the clearance i is small in value, thereby contributing to increasing the pressure inside the combustion chamber C.

In contrast, when the temperature is higher, e.g. about 85° C., the stiffness decreases so that the clearance i is larger, thereby allowing pressure in the combustion chamber to drop.

A first advantage of such a structure lies in the fact that this increases the reproducibility of generator performance over the usual temperature range.

In addition, the use of an elastomer of variable stiffness serves to smooth the performance of the propellant over the same temperature range.

Furthermore, the pressures in the combustion chamber vary to a smaller extent because the maximum pressure is reduced, thereby making it possible to lighten the structure while retaining the same safety coefficient.

Assuming that the generator is subjected to a fire, the mass of elastomer material will melt, such that the piston 5 becomes detached from the orifice 14.

As a result, the mass of propellant can enter into combustion at a pressure that is relatively low, thereby avoiding damage to the structure of the generator due to ejection or fragmentation.

By way of indication, the mass presents the following stiffness values in kilonewtons per millimeter (kN/mm):

| for Shore hardness of 60: | |
|---|---|
| at −40° C.: | 157 kN/mm; |
| at 25° C.: | 142 kN/mm; |
| at 90° C.: | 129 kN/mm; |
| for Shore hardness of 80: | |
| at −40° C.: | 192 kN/mm; |
| at 25° C.: | 157 kN/mm; |
| at 90° C.: | 114 kN/mm. |

The invention claimed is:

1. A gas generator for a motor vehicle safety device, the generator comprising:
   a first chamber for combustion containing a pyrotechnic initiator and a pyrotechnic charge to be triggered by the initiator; and
   a second chamber for diffusion into which a gas that results from combustion of the charge is transferred prior to being exhausted from the gas generator, the first and second chambers being separated from each other by a nozzle partition having at least one communication orifice, the second chamber having a piston for closing and opening the orifice as a function of the gas pressure in the combustion chamber, the piston being urged to a position for closing the orifice by a mass of elastically deformable material, the mass having a stiffness that decreases with increasing temperature so that a clearance is created between the piston and the orifice that increases if the pressure within the first chamber rises and decreases if the pressure within the first chamber decreases;
   wherein the mass is non-metallic.

2. The generator of claim 1, wherein the mass of elastically deformable material is made of elastomer.

3. The generator of claim 1, wherein the mass includes a cylindrical pad.

4. The generator of claim 1, wherein the generator has a substantially cylindrical shape along a longitudinal axis and wherein the orifice and the piston extend on the longitudinal axis.

5. The generator of claim 1, wherein a proximal end of the piston is frustoconical.

6. The generator of claim 1, in combination with the safety device.

7. The generator of claim 6, wherein the safety device is an airbag trigger.

8. The generator of claim 1, wherein the mass is a solid mass.

9. A gas generator for a motor vehicle safety device, the generator comprising:
   a first chamber for combustion including a pyrotechnic charge;
   a second chamber into which a gas that results from combustion of the pyrotechnic charge is transferred prior to being exhausted from the gas generator, the first and second chambers being separated from each other by a nozzle partition having at least one communication orifice;
   a piston movable between a closed state abutting the nozzle partition and an open state spaced apart from the nozzle partition by a predetermined distance; and
   a mass of elastically deformable material biasing the piston into the closed state and movable from a relaxed state to a deformed state in response to pressure from the gas from the first chamber passing through the communication orifice, the mass dynamically varying the predetermined distance in response to ambient temperature conditions and expanding radially in the deformed state.

10. The generator of claim 9, wherein the generator has a substantially cylindrical shape along a longitudinal axis and wherein the orifice and the piston extend on the longitudinal axis.

11. The generator of claim 9, wherein a proximal end of the piston is frustoconical.

12. The generator of claim 9, wherein the mass contracts axially in the deformed state.

13. A gas generator for a motor vehicle safety device, the generator comprising:
   a first chamber for combustion including a pyrotechnic charge;
   a second chamber into which a gas that results from combustion of the pyrotechnic charge is transferred prior to being exhausted from the gas generator, the first and second chambers being separated from each other by a nozzle partition having at least one communication orifice;
   a piston movable along a longitudinal axis in a first direction and a second direction and between a closed state abutting the nozzle partition and an open state spaced apart from the nozzle partition; and
   a solid mass of elastically deformable material urging the piston in said second direction and into the closed state and deformable in response to pressure from said gas from the first chamber passing through the communication orifice to allow the piston to move in the first direction and into the open state, the mass causing the piston to move in both the first and second directions when in the open state to dynamically vary a volume of gas passing through the communication orifice;
   wherein the mass is non-metallic.

14. The generator of claim 13, wherein the mass simultaneously contracts axially and expands radially when in the open state.

15. The generator of claim 13, wherein the generator has a substantially cylindrical shape along the longitudinal axis and wherein the orifice and the piston extend on the longitudinal axis.

16. A gas generator for a motor vehicle safety device, the generator comprising:

a first chamber for combustion containing a pyrotechnic initiator and a pyrotechnic charge to be triggered by the initiator; and a second chamber for diffusion into which a gas that results from combustion of the charge is transferred prior to being exhausted from the gas generator, the first and second chambers being separated from each other by a nozzle partition having at least one communication orifice, the second chamber having a piston for closing and opening the orifice as a function of the gas pressure in the combustion chamber, the piston being urged to a position for closing the orifice by a mass of elastically deformable material, the mass having a stiffness that decreases with increasing temperature so that a clearance is created between the piston and the orifice that increases if the pressure within the first chamber rises and decreases if the pressure within the first chamber decreases;

wherein the mass of elastically deformable material is made of elastomer.

17. A gas generator for a motor vehicle safety device, the generator comprising:

a first chamber for combustion including a pyrotechnic charge;

a second chamber into which a gas that results from combustion of the pyrotechnic charge is transferred prior to being exhausted from the gas generator, the first and second chambers being separated from each other by a nozzle partition having at least one communication orifice;

a piston movable along a longitudinal axis in a first direction and a second direction and between a closed state abutting the nozzle partition and an open state spaced apart from the nozzle partition; and a mass of elastically deformable material urging the piston in said second direction and into the closed state and deformable in response to pressure from said gas from the first chamber passing through the communication orifice to allow the piston to move in the first direction and into the open state, the mass causing the piston to move in both the first and second directions when in the open state to dynamically vary a volume of gas passing through the communication orifice;

wherein the mass simultaneously contracts axially and expands radially when in the open state.

* * * * *